United States Patent [19]
Lawsing

[11] 3,726,302
[45] Apr. 10, 1973

[54] PRESSURE REGULATING VALVE
[75] Inventor: Joseph V. Lawsing, Windsor Locks, Conn.
[73] Assignee: United Aircraft Corporation, East Hartford, Conn.
[22] Filed: Jan. 12, 1972
[21] Appl. No.: 217,113

[52] U.S. Cl. ..................137/117, 137/501, 137/503, 251/61.2, 251/63.4
[51] Int. Cl. ............................................G05d 11/00
[58] Field of Search...................137/117, 500, 503, 137/501; 251/61.2, 61.3, 61.4, 61.5, 63.4

[56] References Cited

UNITED STATES PATENTS 1,178,528  4/1916  Loepsinger.....................251/61.3 X
1,834,596  12/1931  Clapp.............................251/63.4 X
2,154,901  4/1939  Hulse et al..........................137/503

Primary Examiner—Martin P. Schwadron
Assistant Examiner—David J. Zobkiw
Attorney—Norman Friedland

[57] ABSTRACT

The time responsiveness of a pressure regulating valve is increased by including a metering element mounted on the main valve element being movable therewith and relative thereto so as to respond to changes in pressure in the system independently of the main valve element. Pressure droop can be adjusted independently of flow droop, thereby permitting optimum performance.

7 Claims, 1 Drawing Figure

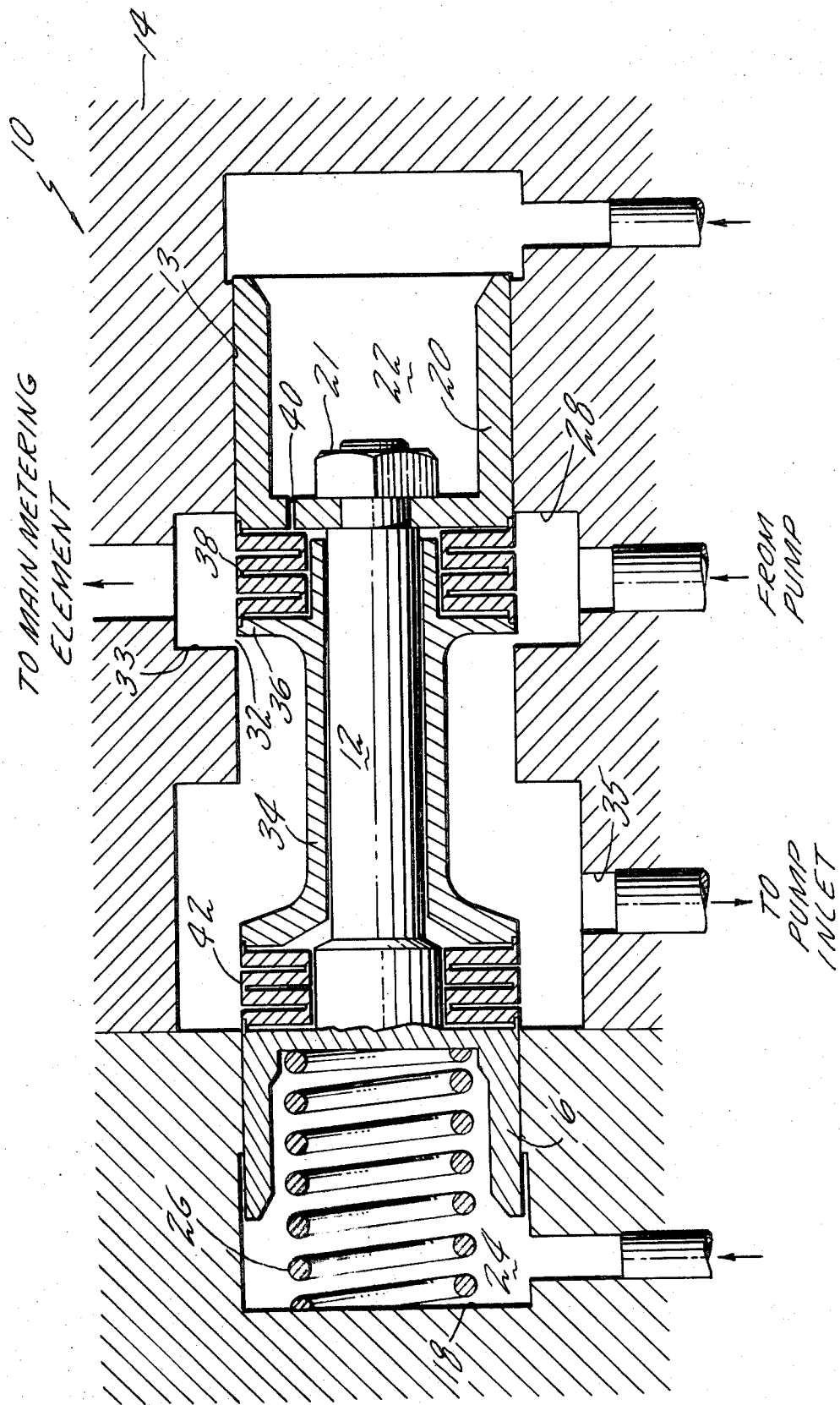

PRESSURE REGULATING VALVE

BACKGROUND OF THE INVENTION

This invention constitutes an improvement over the pressure regulating valve of the type exemplified in U.S. Pat. No. 3,196,613 granted to Robert D. Porter and Charles F. Stearns on July 27, 1965 and assigned to the same assignee which patent is incorporated herein by reference.

As is well known in the art, pressure regulating valves of the type exemplified by this patent are generally utilized to maintain the pressure drop across the fuel control main metering element at a constant value by bypassing any excess amount of fuel around the metering element to assure that the pressure and flow is sufficiently adequate. It is also well known that the heretofore known types of pressure regulating valves are designed to have a high gain so that they by necessity are heavily damped in order to achieve stability. This results in a slow time constant although sufficient to respond to the demands of the relatively slow flow quantity changes. However, such a system has proven to be incapable of compensating for the pressure level fluctuation which may be occasioned for example in a jet engine application by the variation in engine or burner pressure, pump surges and the like.

I have found that I can obviate the problems noted above by providing in a pressure regulating valve as described a metering sleeve which has separate response capabilities wherein the valve can quickly compensate for pressure level changes whether in the bypass areas or in the inlet area thus assuring high performance attendant with the high speed responsiveness.

By virtue of this invention the weight of the portion of the valve responsive to pressure level changes is small and its associated spring rate is relatively high thus giving a high resonant frequency which can, if necessary, be separately damped.

SUMMARY OF THE INVENTION

The primary object of this invention is to provide an improved pressure regulating valve.

A still further object of this invention is to provide a metering sleeve mounted coaxially with the valve element so that it moves with and relative thereto in order to provide quick changes in the metering area in response to pressure fluctuations.

A still further object of this invention is to provide in a pressure regulating valve of the type that has a relatively slow time constant means for imposing a faster time responsiveness to compensate for pressure fluctuations in the system independent of the pressure regulating valve metering element.

A still further object of this invention is to provide in existing types of pressure regulating valve means, independent of the pressure regulating valve, that has a higher time responsiveness than the pressure regulating valve and is characterized by being relatively light in weight and has a high resonant frequency.

Other features and advantages will be apparent from the specification and claims and from the accompanying drawings which illustrate an embodiment of the invention.

BRIEF DESCRIPTION OF THE DRAWING

The sole FIGURE is a view partly in elevation and partly in section illustrating the details of this invention.

DESCRIPTION OF THE PREFERRED EMBODIMENT

Referring to the sole drawing the pressure regulating valve generally illustrated by numeral 10 includes the main spool valve element 12 suitably mounted in the cavity 13 of housing 14. The enlarged diameter portion 16 formed on the end of the valve element 12 is disposed within chamber 18 and the removable enlarged diameter portion 20 mounted on the other end secured to the valve element portion 12 by suitable means such as the nut 21 is movable between the end walls of the cavity. As mentioned in the above, the pressure regulating valve serves to maintain the pressure drop across the main metering orifice (not shown) at a constant value and is done by sensing pressure of the fluid upstream of the main metering valve in chamber 22 and pressure downstream of the metering valve in the chamber 24. The spring load of spring 26 mounted on the end of valve element 12 dictates the value of the pressure drop which the pressure regulating valve serves to maintain at a constant value. Thus fluid upstream of the main metering element is first admitted into port 28 through the pressure regulating valve which serves to deliver the proper amount of fluid to maintain the pressure drop at a constant value, and return the excess fluid to the inlet of the pump (not shown) via orifice 32 and port 35. What has been described above is a typical pressure regulating valve as exemplified in U.S. Pat. No. 3,196,613, supra.

In accordance with this invention a movable sleeve element 34 is slidably mounted on valve element 12 so as to move therewith and relative thereto as will be described hereinbelow. Sleeve element 34 carries a metering flange 36 which serves to define with the shoulder 33 the metering orifice 32. A high spring rate bellows 38 is mounted between the flange 36 and the element 20 so that sleeve 34, bellows 38 and valve element 12 move together in response to changes in pressure in either chamber 22 or chamber 24. By virtue of this change, the flange 36 will be repositioned relative to shoulder 33 to change the metering area of orifice 32. Such a change as just described is usually manifested by a flow change in the system.

In the event of a pressure fluctuation due to a condition upstream or downstream of valve 10, bellows 38 being in the flow path will react thereto. This serves to move element 34 relative to element 12 for changing the metering area of orifice 32. By allowing a separate response capability in the valve wherein the valve can quickly compensate for pressure level changes either in the bypass areas or in the inlet pressure area, high performance can be combined with high speed.

The inner portion of bellows 38 is filled with fluid through the opening 40 formed in a member 20. A second bellows 42 may be incorporated at the other end of element 34 as shown in the drawing.

What has been shown by this invention is means that provide a pressure regulating valve with fast response to changes in pressure drop across the metering orifice while keeping the slower response to flow changes.

Since high gain in a pressure regulator is heavily damped to achieve stability, the inherent slow time constant, which while fast enought to respond to the demands of the relatively slow flow quantity changes, is largely unable to adequately compensate for pressure level fluctuations.

Performance of the standard part of the valve is improved by using a constant gain since damping factor is thus constant at all operating points. The weight of the portion of the valve responsive to pressure level changes is small and its associated spring rate is quite high gives a high resonant frequency. This can be separately damped. By matching the valve gain (area versus stroke) to the effective area of the bellows and the spring rate of the bellows, the valve can be made to have minimum pressure drop.

While the preferred embodiment is described herein as being utilized in a fuel control for a turbine type of power plant it is to be understood that this invention as will be obvious to one ordinarily skilled in the art is suitable for use in all other applications and is accordingly not limited thereto.

It should be understood that the invention is not limited to the particular embodiments shown and described herein, but that various changes and modifications may be made without departing from the spirit or scope of this novel concept as defined by the following claims.

I claim:

1. For a pressure regulating valve of the type that includes a housing, a centrally disposed spool member in the housing adapted to be positioned to meter fluid through an opening in said housing for bypassing a metering member whose pressure is regulated by the pressure regulating valve, the improvement comprising means cooperatively connected to said spool member and being movable therewith and relative thereto and being responsive to pressure fluctuations upstream and downstream of said opening for changing the area of said opening at a rate which is faster relative to the time responsiveness of said spool member.

2. For a pressure regulating valve as claimed in claim 1 wherein said means includes a metering element coaxially disposed relative to said spool member.

3. For a pressure regulating valve as claimed in claim 2 including a flexible resilient pressure sensitive means mounted adjacent one end of said metering element and bearing against said spool member.

4. For a pressure regulating valve as claimed in claim 3 wherein said flexible, resilient, pressure sensitive means is a bellows.

5. For a pressure regulating valve as claimed in claim 3 including another flexible, resilient pressure sensitive means mounted adjacent another end of said metering element and also bearing against said spool member.

6. For a pressure regulating valve as claimed in claim 1 wherein the pressure droop can be adjusted independently of the flow droop.

7. For a pressure regulating valve of the type that includes a housing; a spool member having axially spaced flanges centrally disposed in the housing and adapted to be positioned to meter fluid through an opening in said housing for bypassing a metering member whose pressure is regulated by the pressure regulating valve, the improvement comprising a flow adjusting means coaxially mounted on said spool member, and a pressure responsive member disposed between said flow adjusting means and one of said flanges and sized to move said flow adjusting means with and relative to said spool member and being responsive to pressure fluctuations upstream and downstream of said opening for changing the area of said opening at a rate faster than the rate of movement of said spool member.

* * * * *